US012785338B2

(12) United States Patent
Huang et al.

(10) Patent No.: US 12,785,338 B2
(45) Date of Patent: Nov. 3, 2026

(54) OUTER CONDUCTOR AND COAXIAL CONNECTOR

(71) Applicants: Tyco Electronics Technology (SIP) Ltd., Suzhou (CN); Tyco Electronics (Shanghai) Co., Ltd., Shanghai (CN)

(72) Inventors: Jianlin Huang, Suzhou (CN); Feng (Carlos) Pan, Suzhou (CN); Haomai (Ivan) Yin, Shanghai (CN); Yuanming (Toney) Zhang, Shanghai (CN)

(73) Assignees: Tyco Electronics Technology (SIP) Ltd., Suzhou (CN); Tyco Electronics (Shanghai) Co., Ltd., Shanghai (CN)

(*) Notice: Subject to any disclaimer, the term of this patent is extended or adjusted under 35 U.S.C. 154(b) by 816 days.

(21) Appl. No.: 17/972,289

(22) Filed: Oct. 24, 2022

(65) Prior Publication Data

US 2023/0129483 A1 Apr. 27, 2023

(30) Foreign Application Priority Data

Oct. 22, 2021 (CN) ......................... 202122547588.0

(51) Int. Cl.
*H01R 24/40* (2011.01)
*H01R 13/52* (2006.01)

(52) U.S. Cl.
CPC ......... *H01R 24/40* (2013.01); *H01R 13/5205* (2013.01)

(58) Field of Classification Search
CPC ...... H01R 24/40; H01R 13/5205; H01R 4/70; H01R 13/5202; H01R 13/111; H01R 9/0518; H01R 2103/00
See application file for complete search history.

(56) References Cited

U.S. PATENT DOCUMENTS

| | | | | |
|---|---|---|---|---|
| 6,174,206 B1 * | 1/2001 | Yentile | H01R 24/542 | 439/675 |
| 7,037,127 B2 * | 5/2006 | Williams | H01R 13/111 | 439/857 |
| 7,497,742 B2 * | 3/2009 | Spinnato | H01R 13/111 | 439/851 |
| 2015/0357738 A1 * | 12/2015 | Griepenstroh | H01R 13/187 | 29/874 |
| 2020/0366039 A1 * | 11/2020 | Zheng | B21D 28/28 | |

* cited by examiner

*Primary Examiner* — Oscar C Jimenez
(74) *Attorney, Agent, or Firm* — Barley Snyder

(57) ABSTRACT

An outer conductor of a coaxial connector includes a main body and a first connection part connected to an end of the main body. The first connection part is cylindrical and has a partition slit extending in an axial direction. A protrusion is formed on an inner side of a distal end of the first connection part and is electrically connectable with a mating outer conductor inserted into the first connection part. An outer diameter of the first connection part is smaller than an outer diameter of the main body. An inner diameter of a portion of the first connection part other than the protrusion is constant.

20 Claims, 8 Drawing Sheets

OUTER CONDUCTOR AND COAXIAL CONNECTOR

CROSS-REFERENCE TO RELATED APPLICATION

This application claims the benefit of the filing date under 35 U.S.C. § 119(a)-(d) of Chinese Patent Application No. 202122547588.0, filed on Oct. 22, 2021.

FIELD OF THE INVENTION

The present invention relates to an outer conductor for a coaxial connector and a coaxial connector including the outer conductor.

BACKGROUND

A coaxial connector generally includes a housing, an outer conductor installed in the housing, an insulator inserted into the outer conductor, and a center conductor (or called a center terminal) inserted into the insulator. The outer conductor is used to electrically connect with the shielding layer of the coaxial cable, and the center terminal is used to electrically connect with the conductor of the coaxial cable. In the prior art, however, the structure of the outer conductor of the coaxial connector has a stress concentration, is easy to fatigue and damage after repeated plugging, and has a short service life.

SUMMARY

An outer conductor of a coaxial connector includes a main body and a first connection part connected to an end of the main body. The first connection part is cylindrical and has a partition slit extending in an axial direction. A protrusion is formed on an inner side of a distal end of the first connection part and is electrically connectable with a mating outer conductor inserted into the first connection part. An outer diameter of the first connection part is smaller than an outer diameter of the main body. An inner diameter of a portion of the first connection part other than the protrusion is constant.

BRIEF DESCRIPTION OF THE DRAWINGS

The features of the present invention will become more apparent by describing in detail exemplary embodiments thereof with reference to the accompanying drawings, in which.

DETAILED DESCRIPTION OF THE EMBODIMENTS

Figure 1:
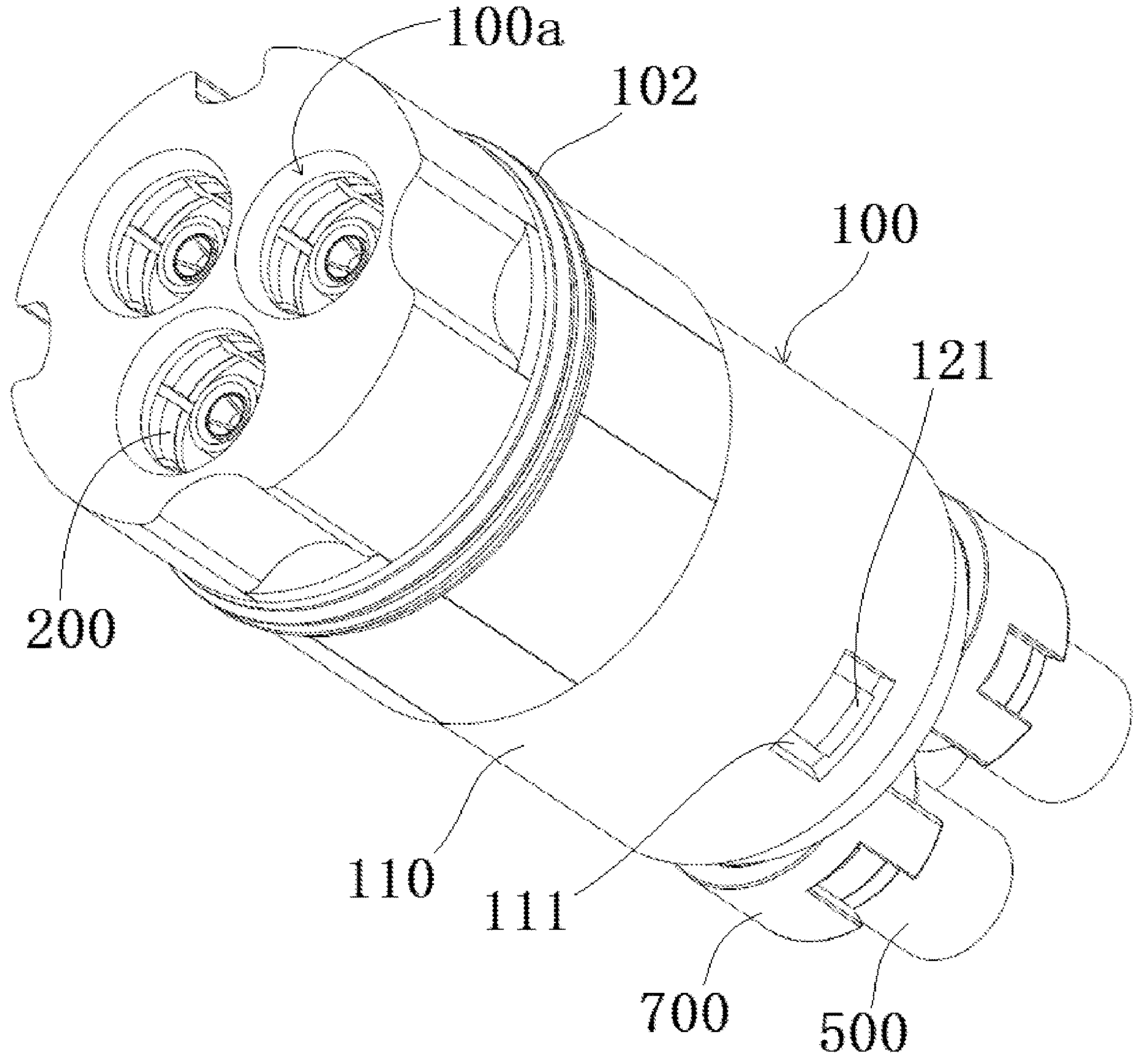
FIG. 1 is a perspective view of a coaxial connector according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in FIGS. 1, 2, 4, and 5, a coaxial connector according to an embodiment includes a housing 100 and a terminal assembly 10. A mounting hole 100*a* is formed in the housing 100. The terminal assembly 10 is mounted in the mounting hole 100*a* of the housing 100.

Figure 2:
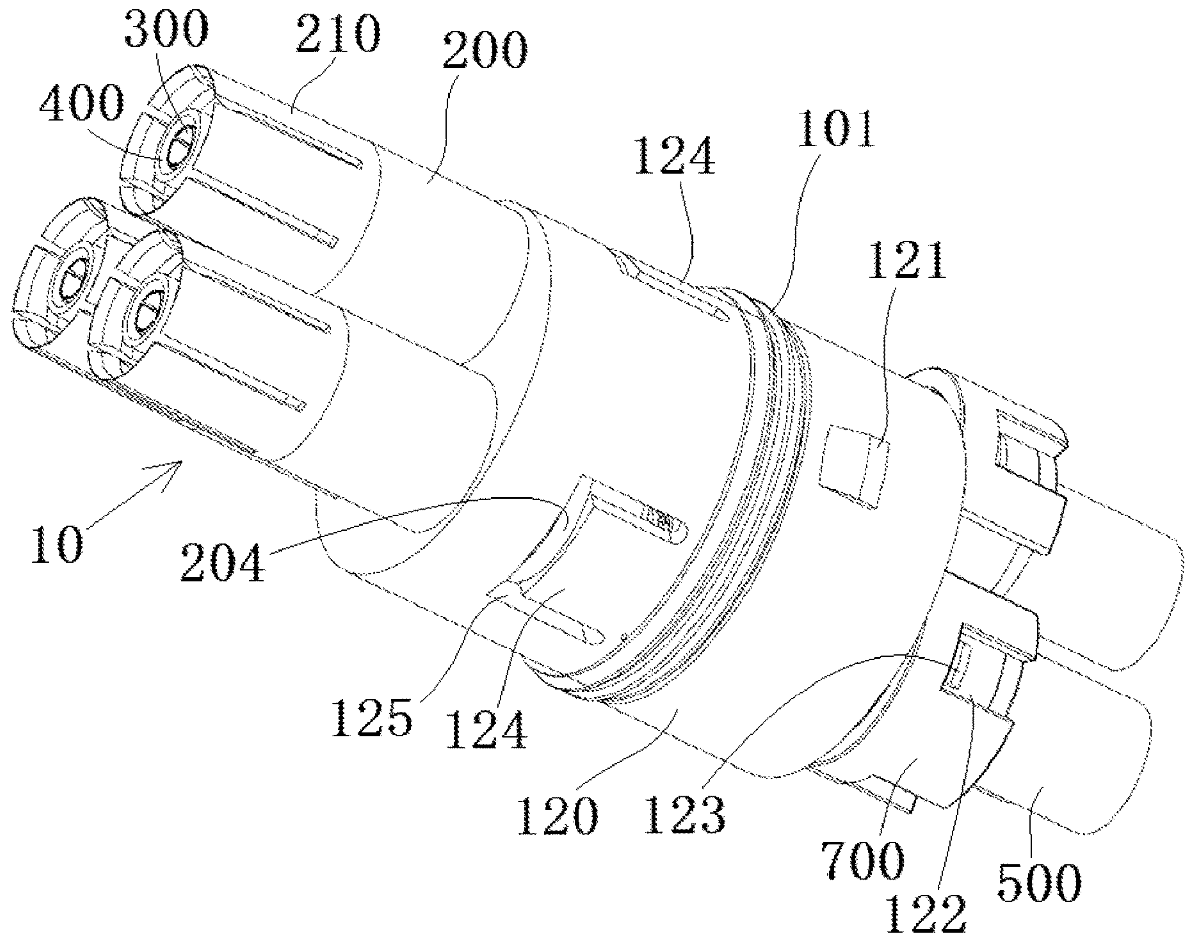
FIG. 2 is a perspective view of the coaxial connector with a housing removed.
Figure 5:
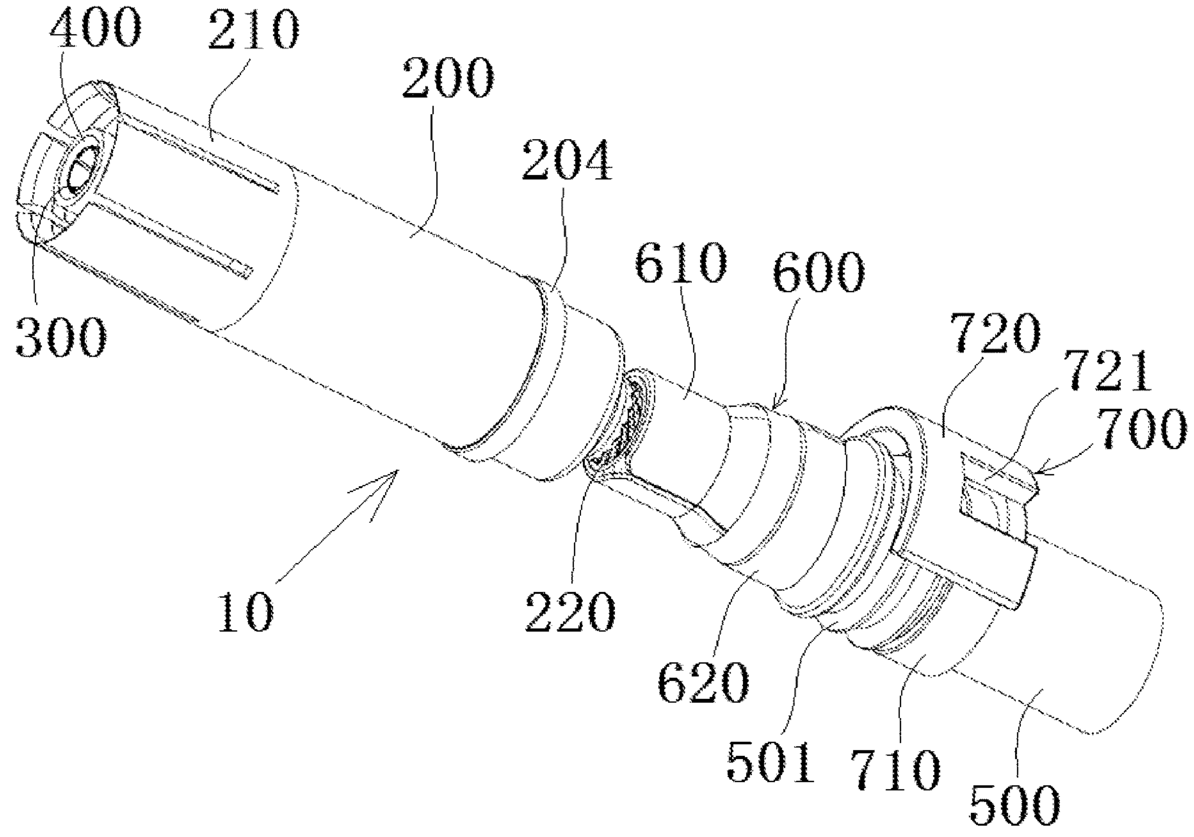
FIG. 5 is a perspective view of one of the terminal assemblies.

The terminal assembly 10, as shown in FIGS. 2 and 5, includes an outer conductor 200, an insulator 400, and a center terminal 300. The insulator 400 is inserted into the outer conductor 200. The center terminal 300 is inserted into the center hole of the insulator 400. The structure of the outer conductor 200 according to an exemplary embodiment of the present invention will be described in detail below with reference to FIGS. 7 and 8.

Figure 7:
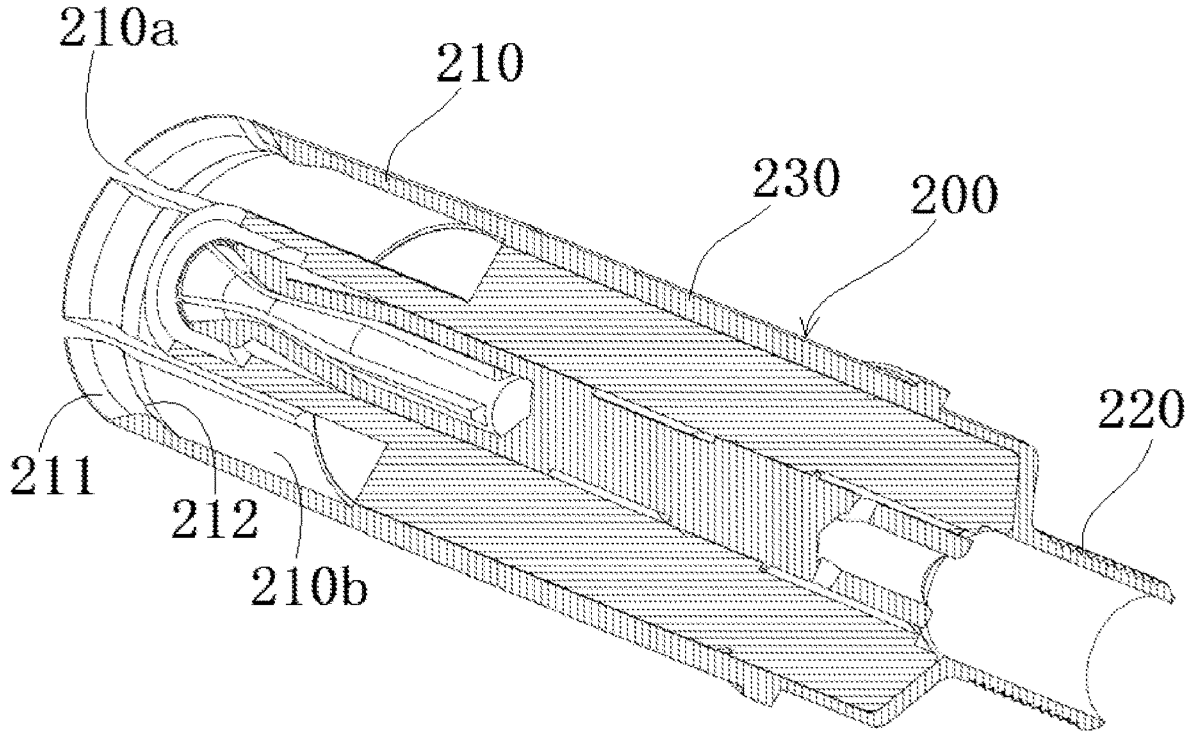
FIG. 7 is a sectional perspective view of the outer conductor, insulator, and center terminal of the terminal assembly.
Figure 8:
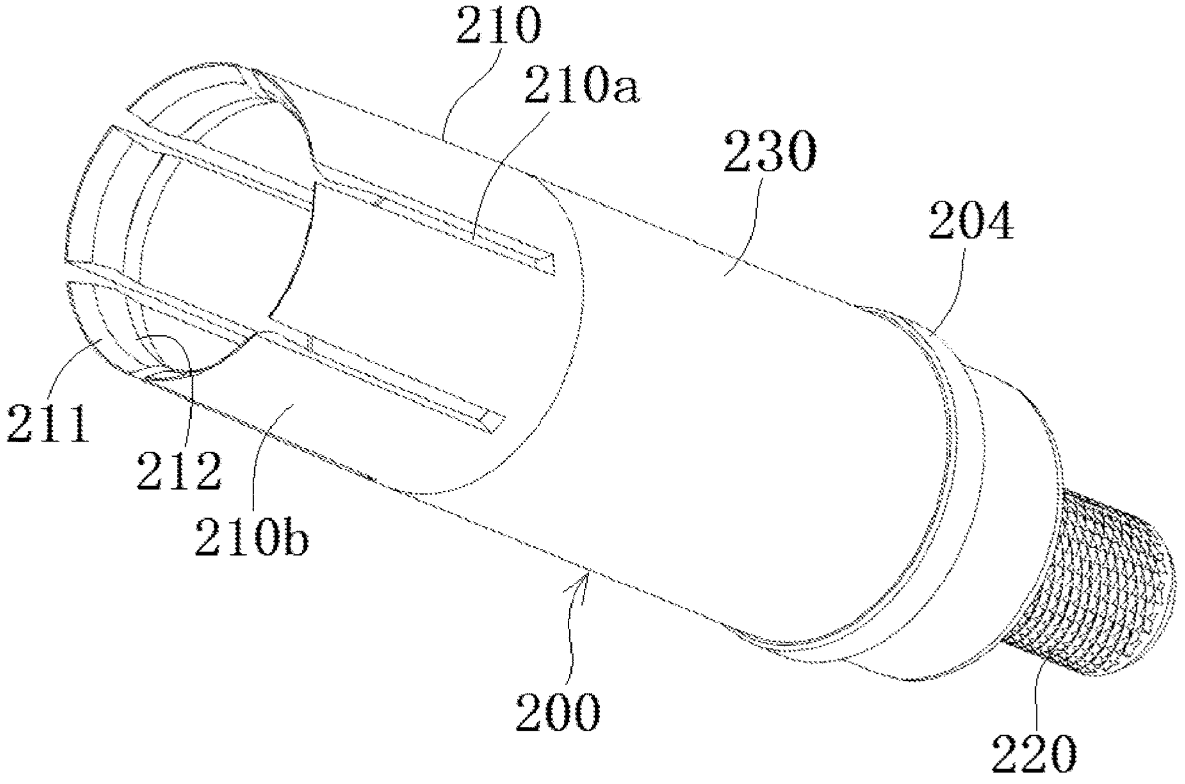
FIG. 8 is a perspective view of the outer conductor.

As shown in FIGS. 7 and 8, in the illustrated embodiment, the outer conductor 200 includes a main body 230 and a first connection part 210. The first connection part 210 is connected to one end of the main body 230. The first connection part 210 has a cylindrical shape and is formed with at least one partition slit 210*a* extending in the axial direction thereof. In the shown embodiment, a plurality of partition slits 210*a* are formed on the first connection part 210, and the plurality of partition slits 210*a* divide the first connection part 210 into a plurality of cantilever parts 210*b*. A protrusion 212 is formed on the inner side of the distal end of the first connection part 210, and the protrusion 212 is adapted to be in electrical contact with a mating outer conductor inserted into the first connection part 210. The outer diameter of the first connection part 210 gradually decreases from its root to its distal end, and the inner diameter of the portion of the first connection part 210 except the protrusion 212 is constant. This causes the wall thickness of the first connection part 210 to gradually decrease from its root toward the protrusion 212.

Before mating with the mating outer conductor, the outer diameter of the first connection part 210 at the protrusion 212 is equal to a first value, and the outer diameter at the root thereof is equal to a second value. After mating with the mating outer conductor, the mating outer conductor contacts the first connection part 210 at the protrusion 212 and expands the first connection part 210 outward, so that the outer diameter of the first connection part 210 at the protrusion 212 increases to a third value, which is greater than the first value and not greater than the second value. Thus, it is not necessary to form a recess on the inner wall of the mounting hole 100*a* of the housing 100 for accommodating the distal end of the first connection part 210, which simplifies the structure of the mounting hole 100*a*.

As shown in FIGS. 7 and 8, in the illustrated embodiment, a guide slope 211 is formed on the inner side of the opening at the end of the first connection part 210, so that the inner surface of the opening at the distal end of the first connection part 210 is gradually flared outward, so as to guide the mating outer conductor to be inserted into the first connection part 210 of the outer conductor member 200. The guide slope 211 extends from the outer edge of the opening at the distal end of the first connection part 210 to the apex of the protrusion 212 to increase the extension length of the guide slope 211.

As shown in FIGS. 7 and 8, the plurality of partition slits 210*a* on the first connection part 210 are evenly spaced around the circumferential direction of the first connector portion 210 to divide the first connection part 210 into a plurality of cantilever parts 210*b*.

As shown in FIGS. 7 and 8, in the illustrated embodiment, the outer conductor 200 further includes a second connection part 220, which is connected to the other end of the main body 230 for electrically connecting with the shielding layer (see FIG. 6) of the coaxial cable 500. In the shown embodiment, uneven microstructures are formed on the outer surface of the second connection part 220, and the shielding layer of the coaxial cable 500 is crimped on the outer surface of the second connection part 220. In this way, the bonding force between the shielding layer of the coaxial cable 500 and the second connection part 220 of the outer conductor 200 can be increased.

As shown in the embodiment of FIGS. 7 and 8, the main body 230 and the second connection part 220 are cylindrical, and the outer diameter of the second connection part 220 is smaller than the inner diameter of the main body 230. In an exemplary embodiment of the present invention, the outer conductor 200 may be an integral machined part.

Figure 6:
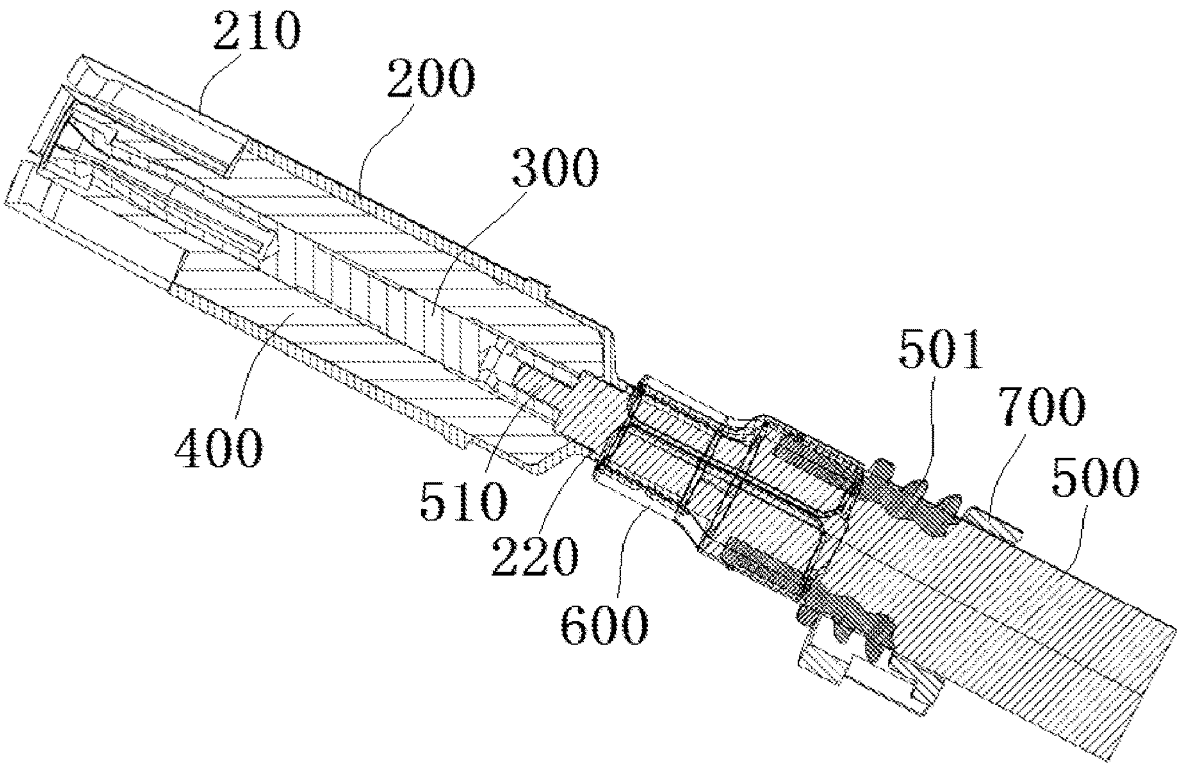
FIG. 6 is a sectional perspective view of one of the terminal assemblies.

FIG. 6 shows a longitudinal sectional view of the terminal assembly 10 shown in FIG. 5. As shown in FIGS. 1-2 and 4-6, in the illustrated embodiment, the terminal assembly 10 further includes a coaxial cable 500. The end of the coaxial cable 500 has an exposed conductor 510 and an exposed shielding layer. The exposed conductor 510 of the coaxial cable 500 is inserted into one end of the center terminal 300, and the center terminal 300 is crimped to the exposed conductor 510 of the coaxial cable 500.

As shown in FIGS. 5 and 6, the terminal assembly 10 further includes a sealing ring 501. The sealing ring 501 is sleeved on the coaxial cable 500 and compressed between the outer surface of the coaxial cable 500 and the inner surface of the mounting hole 100*a* of the housing 100 to realize the sealing between the coaxial cable 500 and the housing 100.

Figure 4:
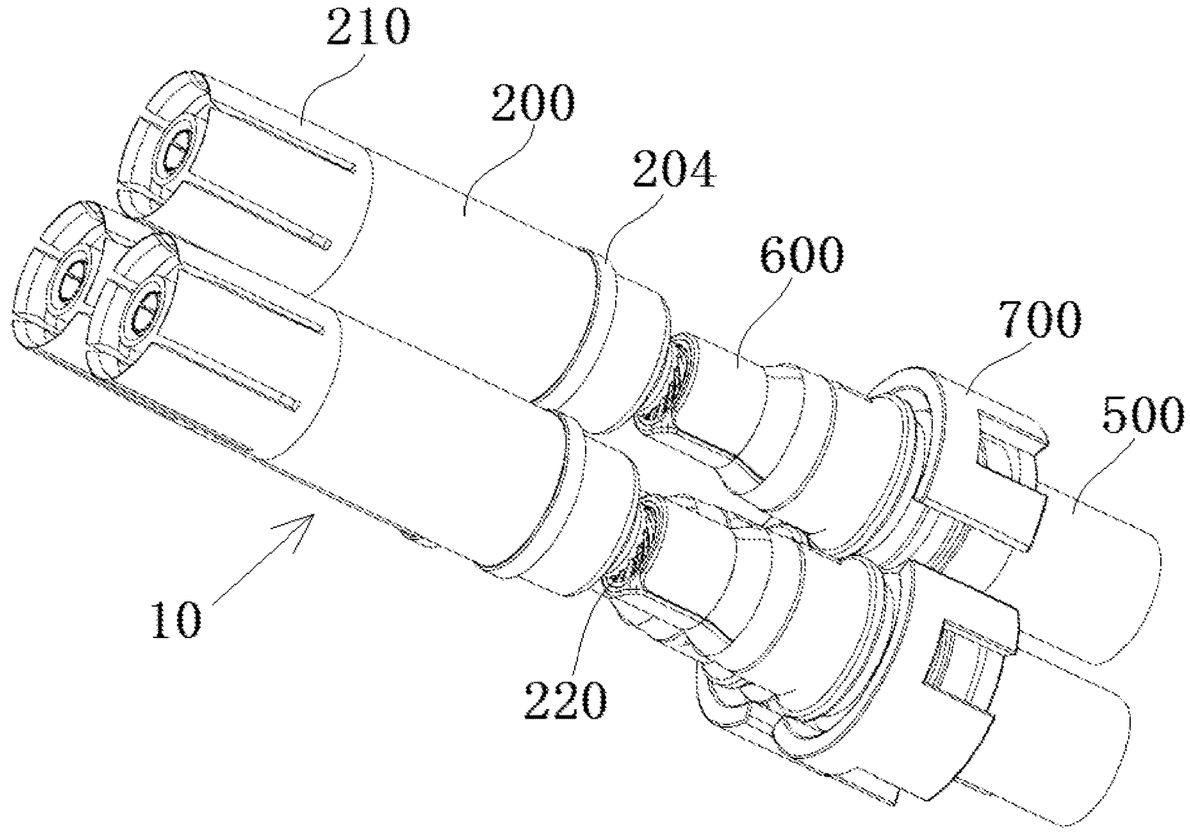
FIG. 4 is a perspective view of a plurality of terminal assemblies of the coaxial connector.

As shown in FIGS. 4-6, in the illustrated embodiment, the terminal assembly 10 further includes a crimping sleeve 600. The crimping sleeve 600 has a first crimping end 610 and a second crimping end 620. The first crimping end 610 of the crimping sleeve 600 crimps the exposed shielding layer of the coaxial cable 500 to the outer surface of the second connection part 220 of the outer conductor 200. The second crimping end 620 of the crimping sleeve 600 crimps one end of the sealing ring 501 to the outer surface of the coaxial cable 500.

As shown in FIG. 1, in the illustrated embodiment, each terminal assembly 10 is integrally inserted into the mounting hole 100*a* of the housing 100 in the form of a single component, so that the installation convenience of the coaxial connector can be improved.

As shown in FIGS. 1 to 6, in the illustrated embodiment, the terminal assembly 10 further includes a sealing end cap 700. The sealing end cap 700 is sleeved on the coaxial cable 500 and fixed to the housing 100 for sealing the opening of the mounting hole 100*a* and transmitting the external pulling force applied to the coaxial cable 500 to the housing 100. In this way, it is possible to prevent dust from entering the mounting hole 100*a* and to prevent the coaxial cable 500 from being pulled off.

The sealing end cap 700, as shown in FIG. 5, includes an annular part 710 and a snap part 720. The annular part 710 is sleeved on the coaxial cable 500 in an interference fit manner. The snap part 720 is connected to the annular part 710 and is formed with a snap slot 721. The annular part 710 is inserted into the opening of the mounting hole 100*a* to seal the opening of the mounting hole 100*a*. A locking protrusion 123 is formed on the rear end 122 of the housing 100, and the locking protrusion 123 is snapped into the snap slot 721 of the sealing end cap 700 to fix the sealing end cap 700 to the housing 100.

In the shown embodiment, the coaxial connector includes three terminal assemblies 10. Three mounting holes 100*a* are formed in the housing 100, as shown in FIG. 1, and the three terminal assemblies 10 are respectively mounted in the three mounting holes 100*a*. In the cross section of the housing 100, that is, in the cross section along the radial direction of the housing 100, the connecting line between the centers of the three mounting holes 100*a* constitutes an equilateral triangle. This arrangement can improve the structural compactness of the coaxial connector and reduce the volume of the coaxial connector. The present invention is not limited to the illustrated embodiment. The number of terminal assemblies 10 in the coaxial connector and the number of mounting holes 100*a* in the housing 100 are not limited to three, but may be two, four or more.

Figure 3:
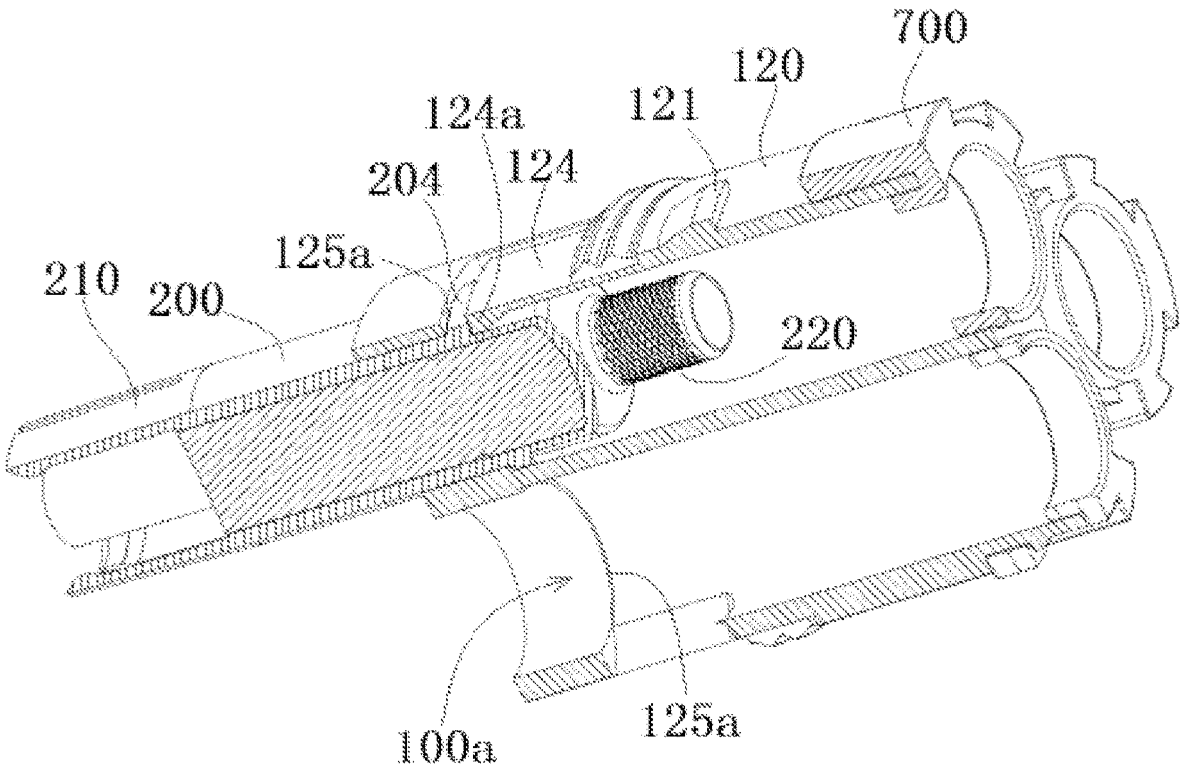
FIG. 3 is a sectional perspective view of an inner housing and an outer conductor of the coaxial connector.

As shown in FIGS. 1-3, in the illustrated embodiment, the housing 100 includes an outer housing 110 and an inner housing 120 mounted in the outer housing 110. An opening 125 and an elastic cantilever 124 suspended in the opening 125 are formed on the peripheral wall of the mounting hole 100*a* of the inner housing 120. The inner wall of the mounting hole 100*a* of the inner housing 120 is formed with a step surface 125*a* opposite to the end portion 124*a* of the elastic cantilever 124. A projection 204 on the outer conductor 200 is sandwiched between the step surface 125*a* and the end portion 124*a* of the elastic cantilever 124 to fix the outer conductor 200 into the mounting hole 100*a* of the housing 100. As shown in the figure, the projection 204 on the outer conductor 200 extends along the circumferential direction of the outer conductor 200. In an embodiment, the projection 204 is annular.

In other embodiments, a ring of annular recess may be formed on the outer conductor 200, and the end portion 124*a* of the elastic cantilever 124 protrudes inward and be snapped into the annular recess of the outer conductor 200. In this way, the outer conductor 200 can also be fixed to the mounting hole 100*a* of the housing 100.

In the shown embodiment, the housing 100 is a split type housing. However, the present invention is not limited to the illustrated embodiment. For example, the housing 100 may be an integral part.

As shown in FIGS. 1 and 3, the mounting hole 100*a* penetrates through the outer housing 110 and the inner housing 120 in the axial direction, and includes a first part located in the outer housing 110 and a second part located in the inner housing 120. The first connection part 210 of the outer conductor 200 is accommodated in the first part of the mounting hole 100*a*, and the second connection part 220 of the outer conductor 200 is accommodated in the second part of the mounting hole 100*a*.

As shown in FIGS. 1 and 3, a protrusion part 121 is formed on the outer surface of the inner housing 120, a notch 111 is formed on the peripheral wall of the outer housing 110, and the protrusion part 121 on the inner housing 120 is snapped into the notch 111 on the outer housing 110, thereby fixing the inner housing 120 in the outer housing 110.

As shown in FIG. 2, the coaxial connector further includes a first sealing ring 101, which is fitted on the inner housing 120 and compressed between the inner housing 120 and the outer housing 110 to realize the sealing between the inner housing 120 and the outer housing 110. In this way, water vapor can be prevented from entering the inside of the coaxial connector through the gap between the inner housing 120 and the outer housing 110.

As shown in FIG. 1, the coaxial connector further includes a second sealing ring 102. The second sealing ring 102 is fitted on the outer housing 110 and is adapted to be compressed between the outer housing 110 and the mating outer housing of the mating coaxial connector to realize the sealing between the outer housing 110 and the mating outer housing. In this way, water vapor can be prevented from entering the inside of the coaxial connector through the gap between the outer housing 110 of the coaxial connector and the mating outer housing of the mating coaxial connector.

Figure 9:
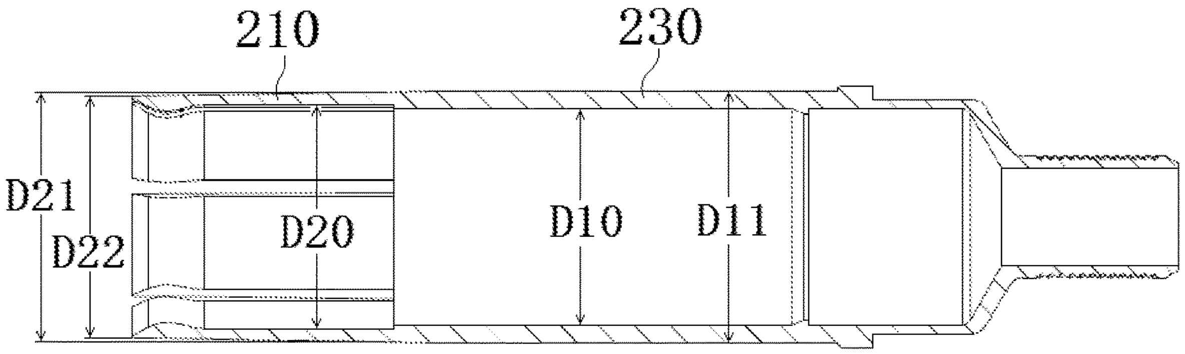
FIG. 9 is a sectional side view of the outer conductor.

As shown in FIGS. 7 to 9, in the illustrated embodiment, the main body 230 and the first connection part 210 of the outer conductor 200 are cylindrical, and the inner diameter D10 of the main body 230 is smaller than or equal to the inner diameter D20 of the portion of the first connection part 210 except the protrusion 212. The outer diameter of the root of the first connection part 210 is D21, the outer diameter of the end of the first connection part 210 is D22, and the outer diameter of the first connection part 210 gradually decreases from D21 at the root to D22 at the end.

As shown in FIGS. 7 to 9, the outer diameter D21 of the root of the first connection part 210 is smaller than the outer diameter D11 of the main body 230. The inner diameter of the first connection part 210 at the protrusion 212 is gradually changed because, in the illustrated embodiment, the protrusion 212 is bored by machining rather than formed by stamping. The inner diameter D10 of the main body 230 is not less than the minimum inner diameter of the first connection part 210 at the protrusion 212.

In the foregoing exemplary embodiments according to the present invention, the outer conductor 200 and the coaxial connector are not fatigued and damaged even if they are repeatedly plugged and unplugged, even for more than 3000 times, thereby improving the service life of the outer conductor 200 and the coaxial connector.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An outer conductor of a coaxial connector, comprising:

a main body; and a first connection part connected to an end of the main body, the first connection part is cylindrical and has a partition slit extending in an axial direction, a protrusion is formed on an inner side of a distal end of the first connection part and is electrically connectable with a mating outer conductor inserted into the first connection part, an outer diameter of the first connection part is smaller than an outer diameter of the main body, and an inner diameter of the first connection part, other than a portion of the first connection part that the protrusion is formed on, is constant.

2. The outer conductor of claim 1, wherein before mating with the mating outer conductor, the outer diameter of the first connection part at the protrusion is equal to a first value, and the outer diameter at a root thereof is equal to a second value, and after mating with the mating outer conductor, the outer diameter of the first connection part at the protrusion is equal to a third value greater than the first value and not greater than the second value.

3. The outer conductor of claim 1, wherein a guide slope is formed inside an opening of the distal end of the first connection part, an inner surface of the opening of the distal end of the first connection part is gradually flared outward, the guide slope extends from an outer edge of the opening at the distal end of the first connection part to an apex of the protrusion.

4. The outer conductor of claim 1, wherein the partition slit is one of a plurality of partition slits evenly spaced around a circumferential direction of the first connection part to divide the first connection part into a plurality of cantilever parts.

5. The outer conductor of claim 1, further comprising a second connection part connected to another end of the main body and electrically connectable with a shielding layer of a coaxial cable, the main body and the second connection part are cylindrical, and an outer diameter of the second connection part is smaller than an inner diameter of the main body.

6. The outer conductor of claim 1, wherein a projection is formed on an outer surface of the main body, the projection is engageable with a housing of the coaxial connector to fix the outer conductor in the housing.

7. The outer conductor of claim 1, wherein the outer diameter of the first connection part gradually decreases from a root of the first connection part to a distal end of the first connection part.

8. The outer conductor of claim 1, wherein an inner diameter of the first connection part at the protrusion is variable.

9. The outer conductor of claim 1, wherein the main body and the first connection part are cylindrical, an inner diameter of the main body is smaller than or equal to the inner diameter of the portion of the first connection part.

10. The outer conductor of claim 9, wherein the inner diameter of the main body is not less than a minimum inner diameter of the first connection part at the protrusion.

11. A coaxial connector, comprising:

a housing having a mounting hole; and a terminal assembly inserted into the mounting hole, the terminal assembly includes:

an outer conductor having a main body and a first connection part connected to an end of the main body, the first connection part is cylindrical and has a partition slit extending in an axial direction, a protrusion is formed on an inner side of a distal end of the first connection part and is electrically connectable with a mating outer conductor inserted into the first connection part, an outer diameter of the first connection part is smaller than an outer diameter of the main body, and an inner diameter of a portion of the first connection part other than the protrusion is constant;

an insulator inserted into the outer conductor;

a center terminal inserted into a center hole of the insulator; and a coaxial cable having a section of exposed conductor and a section of exposed shielding layer at an end, the exposed conductor of the coaxial cable is inserted into an end of the center terminal, and the center terminal is crimped to the exposed conductor of the coaxial cable.

12. The coaxial connector of claim 11, wherein the terminal assembly includes:

a sealing ring sleeved on the coaxial cable and compressed between an outer surface of the coaxial cable and an inner surface of the mounting hole of the housing to seal between the coaxial cable and the housing; and a crimping sleeve having a first crimping end and a second crimping end, the first crimping end crimps the exposed shielding layer of the coaxial cable to an outer surface of a second connection part of the outer conductor, the second crimping end crimps an end of the sealing ring to the outer surface of the coaxial cable.

13. The coaxial connector of claim 12, wherein the terminal assembly includes a sealing end cap sleeved on the coaxial cable and fixed to the housing, the sealing end cap sealing an opening of the mounting hole and transmitting an external pulling force applied to the coaxial cable to the housing.

14. The coaxial connector of claim 13, wherein the sealing end cap includes an annular part sleeved on the coaxial cable in an interference fit manner and a snap part connected to the annular part and formed with a snap slot, the annular part is inserted into the opening of the mounting hole to seal the opening of the mounting hole, a locking protrusion is formed on a rear end of the housing, the locking protrusion is snapped into the snap slot to fix the sealing end cap to the housing.

15. The coaxial connector of claim 11, wherein the terminal assembly is one of a plurality of terminal assemblies and the mounting hole is one of a plurality of mounting holes formed in the housing, the plurality of terminal assemblies are respectively mounted in the plurality of mounting holes, the housing is an integral part.

16. A coaxial connector, comprising:

a housing having a mounting hole, the housing includes an outer housing and an inner housing installed in the outer housing, an opening and an elastic cantilever suspended in the opening are formed on a peripheral wall of the mounting hole at the inner housing, a step surface opposite to an end portion of the elastic cantilever is formed on an inner wall of the mounting hole of the inner housing; and a terminal assembly inserted into the mounting hole, the terminal assembly includes:

an outer conductor having a main body and a first connection part connected to an end of the main body, the first connection part is cylindrical and has a partition slit extending in an axial direction, a protrusion is formed on an inner side of a distal end of the first connection part and is electrically connectable with a mating outer conductor inserted into the first connection part, an outer diameter of the first connection part is smaller than an outer diameter of the main body, and an inner diameter of a portion of the first connection part other than the protrusion is constant, a projection on the outer conductor is sandwiched between the step surface and the end portion of the elastic cantilever to fix the outer conductor in the mounting hole of the housing;

an insulator inserted into the outer conductor; and a center terminal inserted into a center hole of the insulator.

17. The coaxial connector of claim 16, wherein the mounting hole penetrates through the outer housing and the inner housing in the axial direction and includes a first part located in the outer housing and a second part located in the inner housing, the first connection part of the outer conductor is accommodated in the first part of the mounting hole, a the second connection part of the outer conductor is accommodated in the second part of the mounting hole.

18. The coaxial connector of claim 16, wherein a protrusion part is formed on an outer surface of the inner housing, a notch is formed on the peripheral wall of the outer housing, the protrusion part is snapped into the notch to fix the inner housing in the outer housing.

19. The coaxial connector of claim 16, further comprising:

a first sealing ring sleeved on the inner housing and compressed between the inner housing and the outer housing to seal between the inner housing and the outer housing; and/or a second sealing ring sleeved on the outer housing and compressed between the outer housing and a mating outer housing of a mating coaxial connector to seal between the outer housing and the mating outer housing.

20. An outer conductor of a coaxial connector, comprising:

a main body; and a first connection part connected to an end of the main body, the first connection part is cylindrical and has a partition slit extending in an axial direction, a protrusion is formed on an inner side of a distal end of the first connection part and is electrically connectable with a mating outer conductor inserted into the first connection part, an outer diameter of the first connection part is smaller than an outer diameter of the main body, and an inner diameter of a portion of the first connection part other than the protrusion is constant, a projection is formed on an outer surface of the main body, the projection is engageable with a housing of the coaxial connector to fix the outer conductor in the housing.

* * * * *